June 29, 1937.  P. McSHANE  2,085,116
MOTOR CONTROL SYSTEM
Filed April 24, 1936
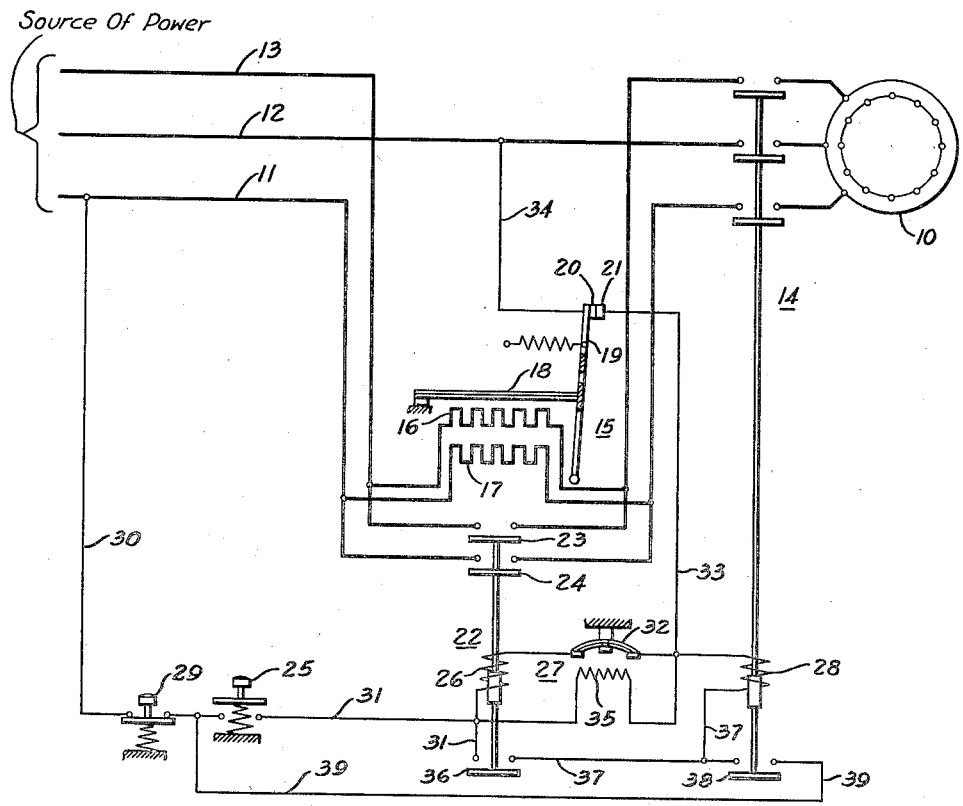
WITNESSES:
Michael Stark
James N. Ely
INVENTOR
Phelan McShane.
BY
Ezra N. Savage
ATTORNEY Patented June 29, 1937

2,085,116

UNITED STATES PATENT OFFICE 2,085,116

MOTOR CONTROL SYSTEM

Phelan McShane, Pittsburgh, Pa., assignor to Westinghouse Electric & Manufacturing Company, East Pittsburgh, Pa., a corporation of Pennsylvania Application April 24, 1936, Serial No. 76,279

4 Claims. (Cl. 172—179)

This invention relates to motor control systems.

In the operation of electrical machines, it is desirable to provide for protecting the machines from overloads which might damage the windings of the machine. Where the machines drive loads of high inertia, they accelerate at a relatively low rate and the motor current during the starting and acceleration of the motor to normal running speed is high.

Where overload relays of sufficient capacity to carry the heavy starting currents required by motors connected to drive high inertia loads are provided for protective purposes, they do not afford adequate overload protection during operation.

An object of this invention is the provision of a system for starting electrical machines driving loads of high inertia whereby the machine may draw heavy currents only during the starting and acceleration of the machine.

Another object of this invention is the provision of a control system for use with electrical machines driving loads of high inertia that will permit heavy currents during the starting and acceleration of the machine and thereafter provide overload protection during the normal running period.

Other objects of this invention will be apparent from the following description when taken in conjunction with the accompanying drawing, the single figure of which is a diagram of the electrical control system provided for starting machines of high inertia as embodied in the teachings of the invention.

Referring to the drawing, the reference character 10 represents a three-phase electrical machine suitable for driving loads having a high inertia and adapted to be connected to a source of power, not shown, by conductors 11, 12 and 13 when the switch or line contactor 14 is actuated to its circuit closing position.

For protection against heavy load currents, an overload device shown generally at 15 is provided in the circuit. The overload device in this particular modification comprises resistors 16 and 17 connected in circuit relation with conductors 13 and 11, respectively, and adapted upon the flow of a predetermined current to the machine 10 to heat up and effect the actuation of the bimetallic member 18 to trip the overload switch 19 and permit the interruption of the circuit through the contacts 20 and 21. When the contact members 20 and 21 are disengaged, the actuating circuit for the line contactor 14 is interrupted and the contactor opens.

When heavy currents are drawn during the starting and acceleration of the motor 10, it is desirable to shunt the resistors 16 and 17 in order to prevent the functioning of the overload device 15. This is accomplished in this particular embodiment of the invention by providing a contactor 22 having two contact members 23 and 24 for connecting the conductors 13 and 11, respectively in shunt relation to the associated resistor elements 16 and 17.

The contactor 22 is disposed to be actuated to its circuit closing position when the normally open start push button switch 25 is actuated to its circuit closing position to energize the actuating coil 26 of the contactor 22. In order to control the period of time during which the contactor 22 is held in its circuit closing position, means such as a Spencer thermostat or a lag thermostat 27 having a thermal time constant equal to that of the motor 10 is provided and connected in circuit with the actuating coil 26 and is designed to open the circuit after a time interval to deenergize the actuating coil 26 and permit the contactor 22 to open, connecting the resistors 16 and 17 in circuit relation with conductors 13 and 11, respectively.

A coil 28 for actuating line contactor 14 to its circuit closing position is connected in circuit relation with actuating coil 26 and is disposed to be energized when the coil 26 is energized and the contactor 22 is in its circuit closing position. A holding circuit for the actuating coil 28 is established when line contactor 14 is in its circuit closing position. The holding circuit may be opened to deenergize actuating coil 28 and permit the line contactor 14 to open either by the operation of the overload relay device 15 to open contact members 20 and 21 or by a manual operation of the normally closed stop push button switch 29.

In operation, in order to start the motor 10, the start push button switch 25 is depressed establishing a circuit which extends from conductor 11 through the conductor 30, normally closed stop push button switch 29, depressed start push button switch 25, conductor 31, actuating coil 26 of the contactor 22, a bimetallic member 32 of the thermostat 27, conductor 33, normally closed contact members 21 and 20 of the overload relay device 15 and conductor 34 to the conductor 12. The closing of the starting push button switch 25 also energizes the heating resistance element 35 of the thermostat 27 which is connected in parallel with actuating coil 26 and the bimetallic member 32. The energization of the coil 26 results in the operation of contactor 22 to close a circuit in which contact members 23 and 24 shunt conductors 13 and 11, respectively around resistor elements 16 and 17 respectively.

Upon the closing of contactor 22, the contact members 36 of contactor 22 establish a closing control circuit for the line contactor 14 from conductor 31 through contact members 36, conductor 37 and the actuating coil 28 to conductor 33 to energize the coil 28 and actuate the line contactor to its circuit closing position. The motor 10 is thus initially energized directly through conductors 11, 12 and 13 and the shunt circuits established by contact members 23 and 24 from the source of power.

When line contactor 14 is in its circuit closing position, contact members 38 of the line contactor 14 bridge conductors 39 and 37 to establish a holding circuit for the switch or line contactor 14 from the normally closed stop switch 29 through conductor 39, contactor 38, conductor 37 and actuating coil 28 to conductor 33 to maintain the energization of the actuating coil 28 after the starting switch 25 is released. The closing of contact members 38 also provides for the energization of actuating coil 26 to maintain the contactor in a circuit closing position to shunt resistors 16 and 17 and to provide current to the resistor element 35 of the thermostat during the short time interval before the thermostat functions.

Where the thermost 27 provided in the circuit is a lag thermostat, it may be adjusted to remain inoperative during the period of time necessary for the acceleration of motor 10 to its normal operating speed. At the end of this short time interval, the bimetallic member 32 of the thermostat expands in response to the heat from the resistance element 35 and opens a circuit causing the deenergization of the actuating coil 26 of the contactor 22. When the coil 26 is deenergized, the contactor 22 returns to its normal open position, opening the shunt circuits established by contact members 23 and 24 around resistance elements 16 and 17, respectively and placing the resistor elements 16 and 17 directly in conductors 13 and 11, respectively.

If at any time during the normal operation of the motor 10 after it has been brought to the desired speed, a heavy current should be drawn, the resistor elements 16 and 17 will heat up in response to the heavy current, causing a movement of the bimetallic member 18 of the overload relay to release the contact arm 19 and open the contact members 20 and 21, and consequently open the holding circuit for the line contactor 14.

If at any time during the normal operation of the motor, it is desired to stop the motor, the normally closed stop push button switch 29 may be manually depressed to open the holding circuit for the line contactor 14.

It is thus evident that this novel scheme provides for the starting of motors connected to drive loads of high inertia by permitting the motor to draw heavy currents during its starting and acceleration period and yet provides normal running overload protection for the motor. The thermostat employed in this system further protects against damage to the motor by preventing frequent repeated starts at short intervals, since the bimetallic element of the thermostat is maintained in its open position when the resistance is heated. This provides against an overheating of the motor such as would result from the repeated starting of the motor at short intervals.

Although this invention has been described with reference to a particular system, it is, of course, understood that other and various modifications thereof may be possible. It is, therefore, not to be restricted except insofar as is necessitated by the prior art and the scope of the appended claims.

I claim as my invention:

1. In a motor control system, in combination, a motor, a source of power for the motor, means including a line contactor for connecting the motor to the source of power to establish a motor circuit, means responsive to overload currents connected in the motor circuit to disconnect the motor from the source of power upon overload, a contactor connected to function to shunt the means responsive to overload conditions before the line contactor is actuated to establish the motor circuit, means dependent upon the functioning of the contactor for actuating the line contactor to establish the motor circuit, and means responsive to the flow of current for actuating the contactor to interrupt the shunt a time interval after the motor has been initially energized.

2. In a motor control system, in combination, a motor, a source of power for the motor, means including a line contactor for connecting the motor to the source of power to establish a motor circuit, means responsive to overload currents connected in the motor circuit to disconnect the motor from the source of power upon overload, a contactor connected to function to shunt the means responsive to overload conditions before the line contactor is actuated to establish the motor circuit, means dependent upon the functioning of the contactor for actuating the line contactor to establish the motor circuit, means responsive to the flow of current for actuating the contactor to interrupt the shunt a time interval after the motor has been initially energized, and means for maintaining the line contactor in position to establish the motor circuit independently of the functioning of the contactor shunting the overload means.

3. In a motor control system, in combination, a motor, a source of power for the motor, means including a line contactor for connecting the motor to the source of power to establish a motor circuit, means responsive to overload currents connected in the motor circuit to disconnect the motor from the source of power upon overload, a contactor connected to function to shunt the means responsive to overload conditions before the line contactor is actuated to establish the motor circuit, means dependent upon the functioning of the contactor for actuating the line contactor to establish the motor circuit, means dependent upon the establishing of the motor circuit by the line contactor to maintain the line contactor in circuit establishing position independently of the shunting contactor, and means responsive to the flow of current for actuating the contactor to interrupt the shunt a time interval after the motor has been initially energized.

4. In a motor control system, in combination, a motor, a source of power for the motor, means including a line contactor for connecting the motor to the source of power to establish a motor circuit, means responsive to overload currents connected in the motor circuit to disconnect the motor from the source of power upon overload, a contactor connected to function to shunt the means responsive to overload conditions before the line contactor is actuated to establish the motor circuit, means dependent upon the functioning of the contactor for actuating the line contactor to establish the motor circuit, means dependent upon the establishing of the motor circuit by the line contactor to maintain the line contactor in circuit establishing position independently of the shunting contactor, means responsive to the flow of current for actuating the shunting contactor to interrupt the shunt a time interval after the motor has been initially energized, and means independent of the means responsive to overload currents for interrupting the actuation of the line contactor to its circuit establishing position to disconnect the motor from the source of power.

PHELAN McSHANE.